United States Patent
Morita et al.

(10) Patent No.: US 8,674,037 B2
(45) Date of Patent: Mar. 18, 2014

(54) SILICON-CONTAINING POLYMER, METHOD OF MANUFACTURING THEREOF, AND CURABLE POLYMER COMPOSITION

(75) Inventors: Yoshitsugu Morita, Ichihara (JP); Yoshinori Taniguchi, Ichihara (JP); Hiroshi Ueki, Ichihara (JP)

(73) Assignee: Dow Corning Toray Company, Ltd., Chyoda-ku, Tokyo (JP)

( * ) Notice: Subject to any disclaimer, the term of this patent is extended or adjusted under 35 U.S.C. 154(b) by 247 days.

(21) Appl. No.: 12/988,785

(22) PCT Filed: Apr. 6, 2009

(86) PCT No.: PCT/JP2009/057415
§ 371 (c)(1),
(2), (4) Date: Dec. 16, 2010

(87) PCT Pub. No.: WO2009/131023
PCT Pub. Date: Oct. 29, 2009

(65) Prior Publication Data
US 2011/0118413 A1    May 19, 2011

(30) Foreign Application Priority Data

Apr. 23, 2008 (JP) .................. 2008-112010

(51) Int. Cl.
*C08G 77/04* (2006.01)
*C08G 77/06* (2006.01)
*C08L 83/05* (2006.01)

(52) U.S. Cl.
USPC ................. 525/478; 528/34; 528/43

(58) Field of Classification Search
USPC .................................... 528/34, 35
See application file for complete search history.

(56) References Cited

U.S. PATENT DOCUMENTS

| | | | |
|---|---|---|---|
| 4,563,514 A * | 1/1986 | Liu et al. | 427/515 |
| 4,645,847 A | 2/1987 | Panster et al. | |
| 4,645,848 A | 2/1987 | Panster et al. | |
| 5,386,007 A * | 1/1995 | Herzig et al. | 528/12 |
| 5,578,380 A * | 11/1996 | Babu | 428/447 |
| 6,696,538 B2 * | 2/2004 | Ko et al. | 528/34 |
| 2004/0054115 A1 | 3/2004 | Lautenschlager et al. | |

FOREIGN PATENT DOCUMENTS

| | | |
|---|---|---|
| EP | 0653447 A1 | 5/1995 |
| JP | 61272236 A | 12/1986 |
| JP | 61272238 A | 12/1986 |
| JP | H07138331 A | 5/1995 |
| JP | 11-217442 A | 8/1999 |
| WO | WO 2007-081212 A1 | 7/2007 |

OTHER PUBLICATIONS

Lindner, et al (Supported Organometallic Complexes XXI Novel D-and T- Functionalized Polysiloxane Matrices for Reactions in Interphases. Z. Anorg. Alleg. Chem. 625, 2133-2143 (Dec. 1999).*
English language abstract for JP 61-272236 extracted from espacenet.com database Apr. 5, 2011, 9 pages.
English language abstract for JP 61-272238 extracted from espacenet.com database Apr. 5, 2011, 12 pages.
English language translation and abstract for JP 11-217442 extracted from PAJ database Apr. 5, 2011, 55 pages.
PCT International Search Report for PCT/JP2009/057415, dated Jun. 4, 2009, 3 pages.
English language abstract for JP H07138331 extracted from the espacenet.com database on Nov. 22, 2013, 2 pages.

* cited by examiner

*Primary Examiner* — Randy Gulakowski
*Assistant Examiner* — Christopher M Rodd
(74) *Attorney, Agent, or Firm* — Howard & Howard Attorneys PLLC

(57) ABSTRACT

A silicon-containing polymer represented by the following average unit formula: $(O_{2/2}SiR_1\text{-}R_2\text{-}C_6H_4\text{-}R_2\text{-}SiR_1O_{2/2})_x[R_3SiO_{(4\text{-}a)/2}]_y(R_4O_{1/2})_z$ (wherein $R_1$ designates identical or different, substituted or unsubstituted monovalent hydrocarbon groups; $R_2$ designates identical or different, substituted or unsubstituted alkylene groups; $R_3$ designates substituted or unsubstituted monovalent hydrocarbon groups; $R_4$ designates alkyl groups or hydrogen atoms; 'a' is a positive number that satisfies the following condition: $0 \le a \le 3$; and 'x', 'y', and 'z' are positive numbers that satisfy the following conditions: $0 < x < 0.1$; $0 < y < 1$; $0 \le z < 0.1$; and $(x+y+z)=1$); and a curable polymer composition comprising: (A) the aforementioned silicon-containing polymer; (B) an organosilicon compound that contains in one molecule at least two silicon-bonded hydrogen atoms; and (C) a hydrosilylation catalyst.

6 Claims, No Drawings

SILICON-CONTAINING POLYMER, METHOD OF MANUFACTURING THEREOF, AND CURABLE POLYMER COMPOSITION

RELATED APPLICATIONS

This application claims priority to and all the advantages of International Patent Application No. PCT/JP2009/057415, filed on Apr. 6, 2009, which claims priority to Japanese Patent Application No. JP2008-112010, filed on Apr. 23, 2008.

TECHNICAL FIELD

The present invention relates to a novel silicon-containing polymer, a method of manufacturing thereof, and a curable polymer composition having the aforementioned polymer as a main component.

BACKGROUND ART

Japanese Unexamined Patent Application Publications (hereinafter referred to as "Kokai") S61-272236 and S61-272238 disclose a silicon-containing polymer that contains units represented by the following formula:

$$O_{3/2}Si\text{—}CH_2CH_2\text{—}C_6H_4\text{—}CH_2CH_2\text{—}SiO_{3/2},$$

and units represented by the following formulae:

$$SiO_{4/2}, R'SiO_{3/2}, \text{ or } R'_2SiO_{2/2}$$

(wherein R' designates a methyl or ethyl group). And Kokai H11-217442 discloses a silicon-containing polymer with repeating units represented by the following formula:

—CH$_2$CH$_2$—C$_6$H$_4$—CH$_2$CH$_2$—
Si(CH$_3$)$_2$[OSi(CH$_3$)]$_y$—.

However, a silicon-containing polymer that is composed of units represented by the following general formula:

$$(O_{2/2}SiR^1\text{-}R^2\text{—}C_6H_4\text{—}R^2\text{—}SiR^1O_{2/2})$$

(wherein R$^1$ designates identical or different, substituted or unsubstituted monovalent hydrocarbon groups, and R$^2$ designates identical or different, substituted or unsubstituted alkylene groups) and units represented by the following general formula:

$$[R^3_a SiO_{(4-a)/2}]$$

(wherein R$^3$ designates substituted or unsubstituted monovalent hydrocarbon groups, and "a" is a positive number that satisfies the following condition: 0≤a≤3) is unknown. And a curable polymer composition that has the aforementioned silicon-containing polymer as the main component is also unknown.

It is an object of the invention to provide a novel silicon-containing polymer composed of units represented by the following general formula:

$$(O_{2/2}SiR^1\text{-}R^2\text{—}C_6H_4\text{—}R^2\text{—}SiR^1O_{2/2})$$

(wherein R$^1$ designates identical or different, substituted or unsubstituted monovalent hydrocarbon groups, and R$^2$ designates identical or different, substituted or unsubstituted alkylene groups) and units represented by the following general formula:

$$[R^3_a SiO_{(4-a)/2}]$$

(wherein R$^3$ designates substituted or unsubstituted monovalent hydrocarbon groups, and "a" is a positive number that satisfies the following condition: 0≤a≤3).

It is another object of the invention to provide a method of manufacturing the aforementioned silicon-containing polymer, and a curable polymer composition where the aforementioned silicon-containing polymer is used as the main component.

DISCLOSURE OF INVENTION

The silicon-containing polymer of the present invention is represented by the following average unit formula:

$$(O_{2/2}SiR^1\text{-}R^2\text{—}C_6H_4\text{—}R^2\text{—}SiR^1O_{2/2})_x$$
$$[R^3_a SiO_{(4-a)/2}]_y (R^4O_{1/2})_z$$

(wherein R$^1$ designates identical or different, substituted or unsubstituted monovalent hydrocarbon groups; R$^2$ designates identical or different, substituted or unsubstituted alkylene groups; R$^3$ designates substituted or unsubstituted monovalent hydrocarbon groups; R$^4$ designates alkyl groups or hydrogen atoms; "a" is a positive number that satisfies the following condition: 0≤a≤3; and "x", "y", and "z" are positive numbers that satisfy the following conditions: 0<x<0.1; 0<y<1; 0≤z<0.1; and (x+y+z)=1).

In the above formulae, R$^1$ may represent an alkyl group or an aryl group, R$^2$ may represent an ethylene group or a propylene group, and R$^3$ may represent an alkyl group, an alkenyl group, or an aryl group.

A method of manufacturing the silicon-containing polymer comprises a step of subjecting a disilyl compound represented by the following general formula (I):

$$(R^5O)_2SiR^1\text{-}R^2\text{—}C_6H_4\text{—}R^2\text{—}SiR^1(OR^5)_2$$

(wherein R$^1$ designates identical or different, substituted or unsubstituted monovalent hydrocarbon groups; R$^2$ designates identical or different, substituted or unsubstituted alkylene groups; and R$^5$ designates identical or different alkyl groups) and a silane compound represented by the following general formula (II):

$$R^3_a Si(OR^5)_{(4-a)}$$

(wherein R$^3$ designates substituted or unsubstituted monovalent hydrocarbon groups; R$^5$ designates alkyl groups; and "a" is a positive number that satisfies the following condition: 0≤a≤3) to cohydrolysis and condensation.

In the general formula (I), R$^1$ may designate an alkyl group or an aryl group, and R$^2$ may designate an ethylene group or a propylene group. In the general formula (II), R$^3$ may designate an alkyl group, an alkenyl group, or an aryl group.

The curable polymer composition comprises:
(A) a silicon-containing polymer represented by the following average unit formula:

$$(O_{2/2}SiR^1\text{-}R^2\text{—}C_6H_4\text{—}R^2\text{—}SiR^1O_{2/2})_x$$
$$[R^3_a SiO_{(4-a)/2}]_y (R^4O_{1/2})_z$$

{wherein R$^1$ designates identical or different, substituted or unsubstituted monovalent hydrocarbon groups; R$^2$ designates identical or different, substituted or unsubstituted alkylene groups; R$^3$ designates substituted or unsubstituted monovalent hydrocarbon groups, with the proviso that in one molecule at least two groups designated by R$^3$ are alkenyl groups; R$^4$ designates alkyl groups or hydrogen atoms; "a" is a positive number that satisfies the following condition: 0≤a≤3; and "x", "y", and "z" are positive numbers that satisfy the following conditions: 0<x<0.1; 0<y<1; 0≤z<0.1; and (x+y+z)=1};
(B) an organosilicon compound that contains in one molecule at least two silicon-bonded hydrogen atoms, wherein the silicon-bonded hydrogen atoms contained in this component are used in an amount of 0.1 to 10 moles per one mole of alkenyl groups contained in component (A); and (C) a hydrosilylation catalyst in a catalytic amount.

In the above formula of component (A), $R^1$ may designate an alkyl group or an aryl group, $R^2$ may designate an ethylene group or a propylene group, and $R^3$ may designate an alkyl group, an alkenyl group, or an aryl group.

Furthermore, component (B) may comprise an organohydrogensiloxane represented by the following average structural formula:

$$R^6{}_b H_c SiO_{(4-b-c)/2}$$

(wherein $R^6$ designates substituted or unsubstituted monovalent hydrocarbon groups that are free of unsaturated aliphatic bonds, and "b" and "c" are positive numbers that satisfy the following conditions: $0.7 \leq b \leq 2.1$; $0.001 \leq c \leq 1.0$; and $0.8 \leq (b+c) \leq 2.6$).

Effects of Invention

The silicon-containing polymer of the present invention is a new compound. The method of the invention makes it possible to manufacture the aforementioned new polymer, and the curable polymer composition of the invention is suitable for obtaining a cured product characterized by a high index of refraction.

DETAILED DESCRIPTION OF THE INVENTION

The silicon-containing polymer of the invention is represented by the following average unit formula:

$$(O_{2/2}SiR^1\text{-}R^2\text{---}C_6H_4\text{---}R^2\text{---}SiR^1O_{2/2})_x$$
$$[R^3{}_a SiO_{(4-a)/2}]_y (R^4 O_{1/2})_z$$

In this formula, $R^1$ designates identical or different, substituted or unsubstituted monovalent hydrocarbon groups that may contain 1 to 12 carbon atoms, preferably 1 to 8 carbon atoms. Specific examples of such groups are the following: methyl, ethyl, propyl, isopropyl, butyl, isobutyl, tert-butyl, pentyl, neopentyl, hexyl, cyclohexyl, octyl, nonyl, decyl, or similar alkyl groups; vinyl, allyl, isopropenyl, butenyl, pentenyl, hexenyl, cyclohexenyl, octenyl, or similar alkenyl groups; phenyl, tolyl, xylyl, naphthyl, or similar aryl groups; benzyl, phenethyl, phenylpropyl, or similar aralkyl groups; or the aforementioned groups wherein a part or all of the hydrogen atoms are substituted with fluorine, bromine, chlorine or similar halogen atoms, cyano groups, etc. Specific examples are the following: chloromethyl, chloropropyl, bromoethyl, trifluoropropyl, or similar halogen-substituted alkyl groups or cyano groups. Most preferable are alkyl groups, and aryl groups, in particular, methyl and phenyl groups.

In the above formula, $R^2$ represents identical or different, substituted or unsubstituted alkylene groups, such as methylene, ethylene, propylene, butylene, isobutylene, pentylene, hexylene, or octylene groups. Most preferable are ethylene and propylene groups.

In the above formula, $R^3$ designates substituted or unsubstituted monovalent hydrocarbon groups which can be exemplified by the same groups as those designated by $R^1$. Most preferable are alkyl, alkenyl, and aryl groups, in particular, methyl, vinyl, allyl, and phenyl groups.

In the above formula, $R^4$ designates alkyl groups or hydrogen atoms. The alkyl groups of $R^4$ can be exemplified by methyl, ethyl, propyl, isopropyl, butyl, and isobutyl groups. Most preferable of these are methyl and ethyl groups.

In the above formula, "a" is a positive number that satisfies the following conditions: $0 \leq a \leq 3$, preferably $0 < a \leq 3$, more preferably $1 \leq a \leq 3$, and most preferably $1 \leq a < 3$.

Furthermore, in the above formula, "x", "y", and "z" are positive numbers that satisfy the following conditions: $0 < x < 0.1$; $0 < y < 1$; $0 \leq z < 0.1$; and $(x+y+z) = 1$.

The silicon-containing polymer of the invention can be exemplified by the following:

a silicon-containing polymer composed of the units represented by the following formula:

$$[O_{2/2}Si(CH_3)\text{---}C_2H_4\text{---}C_6H_4\text{---}Si(CH_3)O_{2/2}]$$

and the units represented by the following formula:

$$[(CH_3)_2 SiO_{2/2}];$$

a silicon-containing polymer composed of the units represented by the following formula:

$$[O_{2/2}Si(CH_3)\text{---}C_3H_6\text{---}C_6H_4\text{---}C_3H_6\text{---}Si(CH_3)O_{2/2}]$$

and the units represented by the following formula:

$$[(CH_3)_2 SiO_{2/2}];$$

a silicon-containing polymer composed of the units represented by the following formula:

$$[O_{2/2}Si(CH_3)\text{---}C_2H_4\text{---}C_6H_4\text{---}C_2H_4\text{---}Si(CH_3)O_{2/2}]$$

and the units represented by the following formula:

$$[(CH_3)(CH_2\!\!=\!\!CH)SiO_{2/2}];$$

a silicon-containing polymer composed of the units represented by the following formula:

$$[O_{2/2}Si(CH_3)\text{---}C_2H_4\text{---}C_6H_4\text{---}C_2H_4\text{---}Si(CH_3)O_{2/2}],$$

the units represented by the following formula:

$$[(CH_3)_2 SiO_{2/2}],$$

and the units represented by the following formula:

$$[(CH_3)_2 SiO_{1/2}];$$

a silicon-containing polymer composed of the units represented by the following formula:

$$[O_{2/2}Si(CH_3)\text{---}C_2H_4\text{---}C_6H_4\text{---}C_2H_4\text{---}Si(CH_3)O_{2/2}],$$

the units represented by the following formula:

$$[(CH_3)_2 SiO_{2/2}],$$

and the units represented by the following formula:

$$[(CH_3)(CH_2\!\!=\!\!CH)SiO_{2/2}];$$

a silicon-containing polymer composed of the units represented by the following formula:

$$[O_{2/2}Si(CH_3)\text{---}C_2H_4\text{---}C_6H_4\text{---}C_2H_4\text{---}Si(CH_3)O_{2/2}],$$

the units represented by the following formula:

$$[(CH_3)(CH_2\!\!=\!\!CH)SiO_{2/2}],$$

and the units represented by the following formula:

$$[SiO_{4/2}];$$ and a silicon-containing polymer composed of the units represented by the following formula:

$$[O_{2/2}Si(CH_3)\text{---}C_2H_4\text{---}C_6H_4\text{---}C_2H_4\text{---}Si(CH_3)O_{2/2}],$$

the units represented by the following formula:

$$[(CH_3)(CH_2\!\!=\!\!CH)SiO_{2/2}],$$

and the units represented by the following formula:

$$[(CH_3)(C_6H_5)SiO_{2/2}].$$

A method of manufacturing the above-described silicon-containing polymers comprises a step of subjecting a disilyl compound represented by the following general formula (I):

$$(R^5 O)_2 SiR^1\text{-}R^2\text{---}C_6H_4\text{---}R^2\text{---}SiR^1(OR^5)_2$$

(wherein $R^1$ designates identical or different, substituted or unsubstituted monovalent hydrocarbon groups; $R^2$ designates identical or different, substituted or unsubstituted alkylene groups; and $R^5$ designates identical or different alkyl groups) and a silane compound represented by the following general formula (II):

$$R^3{}_a Si(OR^5)_{(4-a)}$$

(wherein $R^3$ designates substituted or unsubstituted monovalent hydrocarbon groups; $R^5$ designates alkyl groups; and "a" is a positive number that satisfies the following condition: $0 \le a \le 3$) to cohydrolysis and condensation.

The disilyl compound represented by the following general formula (I):

$$(R^5O)_2 SiR^1\text{-}R^2\text{---}C_6H_4\text{---}R^2\text{---}SiR^1(OR^5)_2$$

is a starting material that is used for introduction of the units represented by the following formula:

$$(O_{2/2}SiR^1\text{-}R^2\text{---}C_6H_4\text{---}R^2\text{---}SiR^1 O_{2/2})$$

into the obtained silicon-containing polymer. In this formula, $R^1$ represents identical or different, substituted or unsubstituted univalent hydrocarbon groups, which can be exemplified by the same groups of this type which have been mentioned above. $R^2$ represents identical or different, substituted or unsubstituted alkylene groups, which can be exemplified by the same alkylene groups of this type which have been mentioned above. $R^5$ designates the same or different alkyl groups, which can be exemplified by the same alkyl groups of $R^4$.

The aforementioned disilyl compounds can be illustrated by the following examples:

$(CH_3O)_2SiCH_3\text{---}C_2H_4\text{---}C_6H_4\text{---}C_2H_4\text{---}SiCH_3(OCH_3)_2$
$(CH_3O)_2SiCH_3\text{---}C_3H_6\text{---}C_6H_4\text{---}C_3H_6\text{---}SiCH_3(OCH_3)_2$
$(C_2H_5O)_2SiCH_3\text{---}C_2H_4\text{---}C_6H_4\text{---}C_2H_4\text{---}SiCH_3(OC_2H_5)_2$
$(C_2H_5O)_2SiCH_3\text{---}C_3H_6\text{---}C_6H_4\text{---}C_3H_6\text{---}SiCH_3(OC_2H_5)_2$
$(CH_3O)_2SiC_6H_5\text{---}C_2H_4\text{---}C_6H_4\text{---}C_2H_4\text{---}SiC_6H_5(OCH_3)_2$
$(CH_3O)_2SiC_6H_5\text{---}C_3H_6\text{---}C_6H_4\text{---}C_3H_6\text{---}SiC_6H_5(OCH_3)_2$ The silane compound represented by the following general formula (II):

$$R^3{}_a Si(OR^5)_{(4-a)}$$

is a starting material that is used for introduction of the units represented by the following formula:

$$[R^3{}_a SiO_{(4-a)/2}]$$

into the obtained silicon-containing polymer. In this formula, $R^3$ represents substituted or unsubstituted univalent hydrocarbon groups, which can be exemplified by the same groups of this type which have been mentioned above. $R^5$ designates alkyl groups exemplified by the same alkyl groups mentioned above. Furthermore, "a" is a positive number that satisfies the following conditions: $0 \le a \le 3$, preferably $0 < a \le 3$, more preferably $1 \le a \le 3$, and most preferably $1 \le a < 3$.

Such silane compounds may be exemplified by tetramethoxysilane, tetraethoxysilane, methyltrimethoxysilane, methyltriethoxysilane, ethyltrimethoxysilane, vinyltrimethoxysilane, phenyltrimethoxysilane, dimethyldimethoxysilane, or methylphenyldimethoxysilane.

The manufacturing method of the invention makes it possible to obtain a silicon-containing compound by causing a cohydrolysis and condensation reaction between the aforementioned disilyl and silane compounds. There are no special restrictions with regard to the hydrolysis and condensation reaction conditions provided that hydrolysis of the disilyl and silane compounds produces a sufficient amount of water. Furthermore, in order to accelerate the cohydrolysis and condensation reactions, hydrolysis and condensation catalysts, such as hydrochloric acid, acetic acid, or similar acids, or sodium hydroxide, potassium hydroxide, or a similar base, can be added.

If the above-described silicon-containing polymer contains in one molecule at least two alkenyl groups, it may constitute the main component of the polymer composition curable with a hydrosilylation reaction. More specifically, such a curable polymer composition may comprise, e.g., of the following components:

(A) a silicon-containing polymer represented by the following average unit formula:

$$(O_{2/2}SiR^1\text{-}R^2\text{---}C_6H_4\text{---}R^2\text{---}SiR^1 O_{2/2})_x$$
$$[R^3{}_a SiO_{(4-a)/2}]_y (R^4 O_{1/2})_z$$

{wherein $R^1$ designates identical or different, substituted or unsubstituted monovalent hydrocarbon groups; $R^2$ designates identical or different, substituted or unsubstituted alkylene groups; $R^3$ designates substituted or unsubstituted monovalent hydrocarbon groups, with the proviso that in one molecule at least two groups designated by $R^3$ are alkenyl groups; $R^4$ designates alkyl groups or hydrogen atoms; "a" is a positive number that satisfies the following condition: $0 \le a \le 3$; and "x", "y", and "z" are positive numbers that satisfy the following conditions: $0 < x < 0.1$; $0 < y < 1$; $0 \le z < 0.1$; and $(x+y+z)=1$};

(B) an organosilicon compound that contains in one molecule at least two silicon-bonded hydrogen atoms, wherein the silicon-bonded hydrogen atoms contained in this component are used in an amount of 0.1 to 10 moles per one mole of alkenyl groups contained in component (A); and (C) a hydrosilylation catalyst in a catalytic amount.

Silicon-containing polymer of component (A) used in the composition is described above. This component must contain in one molecule at least two alkenyl groups designated by $R^3$ in the respective formula. Such alkenyl groups designated by $R^3$ may be exemplified by vinyl, allyl, isopropenyl, butenyl, pentenyl, hexenyl, cyclohexenyl, or octenyl groups. Most preferable are vinyl and allyl groups.

The organo silicon compound of component (B) is used for cross-linking component (A). There are no special limitations with regard to this component, provided that it contains in one molecule at least two silicon-bonded hydrogen atoms. Although there are no special restrictions with regard to viscosity of component (B), it is recommended that the viscosity at 25° C. does not exceed 1,000 mPa·s and be in the range of 0.5 to 500 mPa·s, and preferably in the range of 0.9 to 100 mPa·s. The number of silicon atoms in a molecule of component (B) is not limited but preferably should be in the range of 2 to 200, more preferably 3 to 100, and most preferably 4 to 50. There are no restrictions with regard to the molecular structure of component (B), which may have a linear molecular structure, a cyclic molecular structure, the aforementioned structures which are partially branched, or a three-dimensional network type structure.

Component (B) may be exemplified by a bis(dimethylsilyl) benzene, or a similar non-siloxane compound containing a diorganosilyl group; or an organohydrogensiloxane having silicon-bonded hydrogen atoms. Preferable is an organohydrogensiloxane represented by the following average structural formula:

$$R^6{}_b H_c SiO_{(4-b-c)/2}$$

In this formula, $R^6$ designates a substituted or unsubstituted univalent hydrocarbon group which is free of unsaturated aliphatic bonds and which may contain 1 to 12, and preferably 1 to 8 carbon atoms. Specific examples of these groups are the following: methyl, ethyl, propyl, isopropyl, butyl, isobutyl, tert-butyl, pentyl, neopentyl, hexyl, cyclohexyl, octyl, nonyl, decyl, or similar alkyl groups; phenyl, tolyl, xylyl, naphthyl, or similar aryl groups; benzyl, phenethyl, phenylpropyl, or similar aralkyl groups; the aforementioned groups wherein their hydrogen atoms are partially or completely substituted with fluorine, bromine, chlorine, or another halogen atom, or by a cyano group. Specific examples are the following: a chloromethyl, chloropropyl, bromoethyl, trifluoropropyl, or a similar halogen-substituted alkyl group, or a cyanoethyl group. Preferable are alkyl, aryl, and especially methyl and phenyl groups. Furthermore, in the above formula, "b" and "c" are positive numbers that satisfy the following conditions: $0.7 \leq b \leq 2.1$; $0.001 \leq c \leq 1.0$ and $0.8 \leq (b+c) \leq 2.6$, preferably $0.8 \leq b \leq 2$; $0.01 \leq c \leq 1$ and $1 \leq (b+c) \leq 2.4$.

The aforementioned component (B) can be exemplified by 1,1,3,3-tetramethyldisiloxane, 1,3,5,7-tetramethylcyclotetrasiloxane, a methylhydrogenpolysiloxane capped at both molecular terminals with trimethylsiloxy groups, a copolymer of methylhydrogensiloxane and dimethylsiloxane capped at both molecular terminals with trimethylsiloxy groups, a dimethylpolysiloxane capped at both molecular terminals with dimethylhydrogensiloxy groups, a copolymer of methylhydrogensiloxane and dimethylsiloxane capped at both molecular terminals with dimethylhydrogensiloxy groups, a copolymer of diphenylsiloxane and methylhydrogensiloxane capped at both molecular terminals with trimethylsiloxy groups, a copolymer of dimethylsiloxane, diphenylsiloxane, and methylhydrogensiloxane capped at both molecular terminals with trimethylsiloxy groups, a copolymer composed of $(CH_3)_2HSiO_{1/2}$ units and $SiO_{4/2}$ units, and a copolymer composed of $(CH_3)_2HSiO_{1/2}$ units, $SiO_{4/2}$ units, and $(C_6H_5)SiO_{3/2}$ units.

In the composition of the invention, component (B) is used in an amount such that the silicon-bonded hydrogen atoms contained in this component range from 0.1 to 10 moles, preferably 0.1 to 5 moles, more preferably 0.5 to 5 moles, most preferably 0.8 to 2 moles, and even 1.0 to 1.5 moles per 1 mole of the alkenyl groups contained in component (A). This is because with the content of component (B) below the recommended lower limit the obtained composition either will not be cured to a sufficient degree, or will be oxidized at elevated temperatures because of the presence of residual alkenyl groups in the obtained cured product and therefore will become yellow and unattractive in appearance. If, on the other hand, the content of component (B) exceeds the recommended upper limit, the obtained cured product will become brittle.

Component (C), which is a hydrosilylation catalyst, is used for accelerating a hydrosilylation reaction between alkenyl groups of component (A) and silicon-bonded hydrogen atoms of component (B). Component (C) can be exemplified by platinum-type catalysts, rhodium-type catalysts, and palladium-type catalysts. Platinum-type catalysts are preferable since they provide most remarkable acceleration of the hydrosilylation reaction. The platinum-type catalysts can be represented by a fine platinum powder, a chloroplatinic acid, an alcohol solution of a chloroplatinic acid, an alkenylsiloxane complex of platinum, an olefin complex of platinum, and a carbonyl complex of platinum. Most preferable is an alkenylsiloxane complex of platinum. The alkenylsiloxane of the complex can be exemplified by the following compounds: 1,3-divinyl-1,1,3,3-tetramethyldisiloxane, 1,3,5,7-tetramethyl-1,3,5,7-tetravinylcyclotetrasiloxane, the aforementioned alkenylsiloxane compounds where some of the methyl groups are substituted with ethyl, phenyl, or similar groups, and the aforementioned alkenylsiloxane compounds where vinyl groups are substituted with allyl, hexenyl, or similar groups.

There are no special restrictions with regard to the content of component (C), provided that it is added in a catalytic amount sufficient for accelerating the hydrosilylation reaction between components (A) and (B). It may be recommended, however, that in terms of weight units this component be added in such an amount that the content of the catalytic metal in component (C) be in the range of 0.01 to 1,000 ppm, preferably 0.1 to 500 ppm per total weight of components (A) and (B).

As an arbitrary component, the composition of the invention may also contain an organosiloxane represented by the following average structural formula:

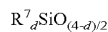

$$R^7_d SiO_{(4-d)/2}$$

(wherein $R^7$ represents substituted or unsubstituted monovalent hydrocarbon groups, and alkoxy group, or a hydroxyl group, with the proviso that in one molecule at least two groups designated by $R^7$ are alkenyl groups, and "d" comprises a positive number that satisfies the following condition: $0 < d < 2$). The monovalent hydrocarbon groups designated by $R^7$ may be the same as those exemplified above for $R^1$. Furthermore, in the above formula, "d" is a positive number that satisfies the following condition: $0 < d < 2$, preferably $1 \leq d < 2$, more preferably $1 \leq d \leq 1.8$, and most preferably $1 \leq d \leq 1.5$. There are no special restrictions with regard to the content of the aforementioned organosiloxane but preferably this organosiloxane should be added in an amount of 0.1 to 100 parts by weight per 100 parts by weight of component (A).

In order to adjust the speed of curing, the composition may be combined with reaction inhibitors such as 2-methyl-3-butyn-2-ol, 3,5-dimethyl-1-hexyn-3-ol, 2-phenyl-3-butyn-2-ol, or similar alkyn alcohols; 3-methyl-3-penten-1-yne, 3,5-dimethyl-3-hexen-1-yne, or a similar enyne compound; 1,3,5,7-tetramethyl-1,3,5,7-tetravinyl-cyclotetrasiloxane, 1,3,5,7-tetramethyl-1,3,5,7-tetrahexenyl-cyclotetrasiloxane, benzotriazole, or the like. There are no special restrictions with regard to the quantities in which these inhibitors can be added but it may be recommended that in terms of weight units these inhibitors be added in a quantity of 10 to 1,000 ppm per weight of the composition.

The composition may also contain an adhesion-imparting agent. Such an agent may comprise an organosilicon compound that contains in one molecule at least one silicon-bonded alkoxy group. Examples of the aforementioned alkoxy groups are methoxy, ethoxy, propoxy, butoxy, and methoxyethoxy groups, of which methoxy groups are preferable. Silicone-bonded groups of the organosilicon compound other than the alkoxy groups may be exemplified by alkyl, alkenyl, aryl, aralkyl, halogenated alkyl, or other substituted or unsubstituted monovalent hydrocarbon groups; 3-glycidoxypropyl, 4-glycidoxybutyl, or similar glycidoxyalkyl groups; 2-(3,4-epoxychlorohexyl)ethyl, 3-(3,4-epoxycyclohexyl)propyl, or similar epoxycyclohexylalkyl groups; 4-oxiranylbutyl, 8-oxiranyloctyl, or similar oxiranylalkyl groups, or other epoxy-containing organic groups; 3-methacryloxypropyl, or similar acryl-containing organic groups; as well as hydrogen atoms. It is recommended that the aforementioned adhesion-imparting agent have groups capable of participating in a hydrosilylation reaction with components (A) or (B). Adhesion-imparting agents that contain in one molecule at least one epoxy-containing organic group are preferable since they provide better adhesion to various substrates. Example of such adhesion-imparting agents are organosilanes and organosiloxane oligomers. The organosiloxane oligomers may have a linear molecular structure, a partially branched molecular structure, a branched molecular structure, a cyclic molecular structure, or a net-like molecular structure. Most preferable are linear, branched, or net-like molecular structures.

More specific examples of the aforementioned adhesion-imparting agents are the following: 3-glycidoxypropyl-trimethoxyliane, 2-(3,4-epoxychlorohexyl)ethyl-trimethoxysilane, 3-methacryloxypropyl-trimethoxysilane, or a similar silane compound; a siloxane compound having in its molecule at least one silicon-bonded alkenyl group or a silicon-bonded hydrogen atom, and a silicon-bonded alkoxy group; a mixture of a silane compound or a siloxane compound having in its molecule at least one silicon-bonded alkoxy group with a siloxane compound having in its molecule at least one silicon-bonded hydroxy group and a silicon-bonded alkenyl group; a siloxane compound of the following formula:

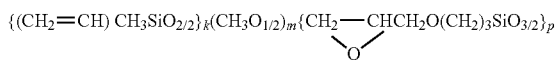

(wherein "k", "m", and "p" are positive numbers); or a siloxane compound of the following formula:

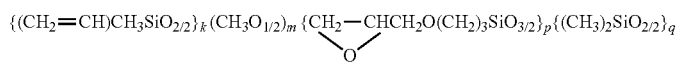

(wherein "k", "m", "p", and "q" are positive numbers).

It is recommended that the aforementioned adhesion-imparting agent be a low-viscosity liquid. Although there are no special limitations with regard to viscosity, it may be recommended that the viscosity at 25° C. be in the range of 1 to 500 mPa·s. There are no special restrictions with regard to the quantities in which the adhesion-imparting agent can be added, but normally it is added in the quantities not exceeding 15 parts by weight, preferably 0.01 to 10 parts by weight, and most preferably 0.5 to 10 parts by weight per 100 parts by weight of component (A).

If necessary, the composition of the invention can be combined with various arbitrary components, such as photosensitizers, high fatty acid metal salts, ester-type waxes, plasticizers, flexibility improvers, fillers, or silane-coupling agents, The flexibility improvers may comprise silicone oils or silicone gums. The fillers can be exemplified by glass fiber, alumina fiber, ceramic fiber that incorporates alumina and silica, boron fiber, zirconia fiber, silicon-carbide fiber, metal fiber, polyester fiber, aramide fiber, Nylon fiber, phenol fiber, natural plant or animal fiber, or similar fibrous fibers; fused silica, precipitated silica, fumed silica, baked silica, zinc oxide, baked clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia, or a similar powdered material, or mixtures of the aforementioned fillers in a combination of two or more.

EXAMPLES

The silicon-containing polymer, the method of manufacturing thereof, and the curable polymer composition of the invention will be further described in more details. The viscosities were measured at 25° C., and the characteristics of the polymers and cured products of the compositions were measured by the methods described below.

[Index of Refraction]
The index of refraction of the silicon-containing polymer at 25° C. was measured using an Abbe refractometer. A light source used for measurements had a wavelength of 589 nm. The index of refraction of a cured product obtained by heating and curing the curable polymer composition for 10 min. at 150° C. in a hot-air-circulation oven was measured in the same manner as above.

[Viscosity]
Viscosity of the silicon-containing polymer was measured by the E-type viscometer (Digital Viscometer DV-U-E Model II, the product of Tokimek Co., Ltd.) at 1.5 rpm.

[Mass-Average Molecular Weight ($M_w$) and Dispersity ($M_w/M_n$) of the Silicon-Containing Polymer]
First, a toluene solution of the silicon-containing polymer was formed. The number-average molecular weight (KO and the weight-average molecular weight ($M_w$) referenced to standard polystyrene were determined by gel permeation chromatography of the toluene medium, and then dispersity was determined as a ($M_w/M_n$) ratio.

[Surface Tack of the Cured Product]
A cured sheet-like product was manufactured by heating the curable polymer composition for 10 min. in an oven at 150° C. The surface-tack property was evaluated by touching the surface of the cured product with a finger.

Reference Example 1

A bis(methyldichlorosilylethyl)benzene was formed by causing an addition reaction between a divinyl benzene (a mixture of m- and p-divinylbenzene, the product of Sankyo Kasei Co., Ltd.) and a methyldichlorosilane. The obtained product was treated with methanol, whereby a bis(methyldimethoxysilylethyl)benzene was obtained.

Practical Example 1

A mixture was prepared from the following components: 3.08 g (0.009 mole) of the bis(methyldimethoxysilylethyl)benzene obtained in Reference Example 1; 82.8 g of a methylphenylcyclosiloxane (a mixture of trimers, quatromers, and pentamers) (containing 0.6 moles of methylphenylsiloxane units), and a potassium hydroxide (contained in the reaction system in the quantity of 250 ppm, in terms of the weight units). The obtained mixture was stirred for 2 hours at 100° C. Viscosity of the reaction solution was increased, methanol was separated, and a condensation product was formed. Following this, 2 ml of water and 3.7 g (0.02 mole) of a 1,3-divinyl-tetramethyl-disiloxane were introduced into the system, and the mixture was stirred for 3 hours at 130° C. The potassium hydroxide was neutralized, and stripping was carried out at 120° C. for 3 hours under a pressure of 2 mmHg.

The obtained product comprised a transparent liquid. The structure of the obtained product was determined by conducting $^1$H Nuclear Magnetic Resonance Analysis (hereinafter referred to as $^1$H-NMR), $^{13}$C Nuclear Magnetic Resonance Analysis (hereinafter referred to as $^{13}$C-NMR), and $^{29}$Si Nuclear Magnetic Resonance Analysis (hereinafter referred to as $^{29}$Si-NMR). The analyses showed that the product comprised a silicon-containing polymer represented by the following average unit formula:

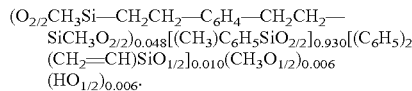
$(O_{2/2}CH_3Si-CH_2CH_2-C_6H_4-CH_2CH_2-SiCH_3O_{2/2})_{0.048}[(CH_3)C_6H_5SiO_{2/2}]_{0.930}[(C_6H_5)_2(CH_2=CH)SiO_{1/2}]_{0.010}(CH_3O_{1/2})_{0.006}(HO_{1/2})_{0.006}$.

The index of refraction was 1.55, viscosity was 85,000 mPa·s, and the content of vinyl groups was 0.22 wt. %. Gel permeation chromatography (hereinafter referred to as GPC) showed that the weight-average molecular weight ($M_w$) was equal to 26,000, and the dispersity ($M_w/M_n$) was equal to 6.4.

Practical Example 2

A mixture was prepared from the following components: 2.74 g (0.08 mole) of the bis(methyldimethoxysilylethyl) benzene obtained in Reference Example 1; 98.0 g of a methylphenylcyclosiloxane (a mixture of trimers, quatromers, and pentamers) (containing 0.6 moles of methylphenylsiloxane units), and a potassium hydroxide (contained in the reaction system in the quantity of 250 ppm, in terms of weight units). The obtained mixture was stirred for 2 hours at 100° C. Viscosity of the reaction solution was increased, methanol was separated, and a condensation product was formed. Following this, 2 ml of water and 3.7 g (0.02 mole) of a 1,3-divinyl-tetramethyl-disiloxane were introduced into the system, and the mixture was stirred for 3 hours at 130° C. The potassium hydroxide was neutralized, and stripping was carried out at 120° C. for 3 hours under a pressure of 2 mmHg.

The obtained product comprised a transparent liquid. The NMR analyses conducted in the same manner as in Practical Example 1 showed that the product comprised a silicon-containing polymer represented by the following average unit formula:

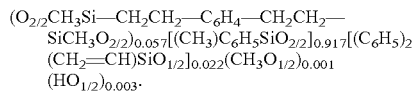
$(O_{2/2}CH_3Si-CH_2CH_2-C_6H_4-CH_2CH_2-SiCH_3O_{2/2})_{0.057}[(CH_3)C_6H_5SiO_{2/2}]_{0.917}[(C_6H_5)_2(CH_2=CH)SiO_{1/2}]_{0.022}(CH_3O_{1/2})_{0.001}(HO_{1/2})_{0.003}$.

The index of refraction was 1.55, viscosity was 34,000 mPa·s, and the content of vinyl groups was 0.47 wt. %. GPC showed that the weight-average molecular weight ($M_w$) was equal to 14,550, and the dispersity ($M_w/M_n$) was equal to 8.3.

Practical Example 3

5 mg of 2-phenyl-3-butyn-2-ol were added to 10.0 g of the silicon-containing polymer obtained in Practical Example 1. After the components were mixed at 100° C., the mixture was cooled to room temperature and then combined with a 10 wt. % isopropanol solution of a 1,3-divinyl-tetramethyldisiloxane complex of platinum (which was added in the quantity of 6.6 ppm of weight units of the metallic platinum per weight of the composition), and with 0.18 g of an organohydrogenpolysiloxane that had a viscosity of 30 mPa·s and was represented by the following average unit formula:

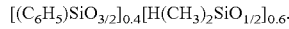
$[(C_6H_5)SiO_{3/2}]_{0.4}[H(CH_3)_2SiO_{1/2}]_{0.6}$.

As a result, a curable polymer composition was prepared. The composition was placed into a 50 mm-diameter aluminum plate and cured for 10 min. in an oven at 150° C. The obtained cured product was transparent, had a non-tacky surface, and a coefficient of refraction equal to 1.55.

Practical Example 4

5 mg of 2-phenyl-3-butyn-2-ol were added to 10.0 g of the silicon-containing polymer obtained in Practical Example 2. After the components were mixed at 100° C., the mixture was cooled to room temperature and then combined with a 10 wt. % isopropanol solution of a 1,3-divinyl-tetramethyldisiloxane complex of platinum (which was added in the quantity of 6.6 ppm of weight units of the metallic platinum per weight of the composition), and with 0.4 g of an organohydrogenpolysiloxane that had a viscosity of 30 mPa·s and was represented by the following average unit formula:

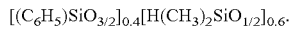
$[(C_6H_5)SiO_{3/2}]_{0.4}[H(CH_3)_2SiO_{1/2}]_{0.6}$.

As a result, a curable polymer composition was prepared. The composition was placed into a 50 mm-diameter aluminum plate and cured for 10 min. in an oven at 150° C. The obtained cured product was transparent, had a non-tacky surface, and an index of refraction equal to 1.55.

Practical Example 5

5 mg of 2-phenyl-3-butyn-2-ol were added to 10.0 g of the silicon-containing polymer obtained in Practical Example 2. After the components were mixed at 100° C., the mixture was cooled to room temperature and then combined with a 10 wt. % isopropanol solution of a 1,3-divinyl-tetramethyldisiloxane complex of platinum (which was added in the quantity of 6.6 ppm of weight units of the metallic platinum per weight of the composition), and with 0.6 g of an organohydrogenpolysiloxane that had a viscosity of 30 mPa·s and was represented by the following average unit formula:

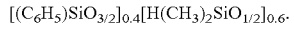
$[(C_6H_5)SiO_{3/2}]_{0.4}[H(CH_3)_2SiO_{1/2}]_{0.6}$.

As a result, a curable polymer composition was prepared. The composition was placed into a 50 mm-diameter aluminum plate and cured for 10 min. in an oven at 150° C. The obtained cured product was transparent, had a non-tacky surface, and an index of refraction equal to 1.55.

Comparative Example 1

5 mg of 2-phenyl-3-butyn-2-ol were added to 10.0 g of a methylphenylpolysiloxane capped at both molecular terminals with dimethylvinylsiloxy groups and having viscosity of 26,000 mPa·s [($M_w$) was equal to 15,000, and the dispersity ($M_w/M_n$) was equal to 13.5]. After the components were mixed at 100° C., the mixture was cooled to room temperature and then combined with a 10 wt. % isopropanol solution of a 1,3-divinyl-tetramethyldisiloxane complex of platinum (which was added in the quantity of 6.6 ppm of weight units of the metallic platinum per weight of the composition), and with 0.3 g of an organohydrogenpolysiloxane that had a viscosity of 30 mPa·s and was represented by the following average unit formula:

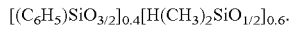
$[(C_6H_5)SiO_{3/2}]_{0.4}[H(CH_3)_2SiO_{1/2}]_{0.6}$.

As a result, a curable polymer composition was prepared. The composition was placed into a 50 mm-diameter aluminum plate and cured for 10 min. in an oven at 150° C. The obtained cured product was transparent, had a tacky surface, and an index of refraction equal to 1.54.

Comparative Example 2

5 mg of 2-phenyl-3-butyn-2-ol were added to 10.0 g of a methylphenylpolysiloxane capped at both molecular terminals with dimethylvinylsiloxy groups and having viscosity of 26,000 mPa·s [($M_w$) was equal to 15,000, and the dispersity ($M_w/M_n$) was equal to 13.5]. After the components were mixed at 100° C., the mixture was cooled to room temperature and then combined with a 10 wt. % isopropanol solution of a 1,3-divinyl-tetramethyldisiloxane complex of platinum (which was added in the quantity of 6.6 ppm of weight units of the metallic platinum per weight of the composition), and with 0.6 g of an organohydrogenpolysiloxane that had a viscosity of 30 mPa·s and was represented by the following average unit formula:

$$[(C_6H_5)SiO_{3/2}]_{0.4}[H(CH_3)_2SiO_{1/2}]_{0.6}.$$

As a result, a curable polymer composition was prepared. The composition was placed into a 50 mm-diameter aluminum plate and cured for 10 min. in an oven at 150° C. The obtained cured product was transparent, had a tacky surface, and an index of refraction equal to 1.54.

INDUSTRIAL APPLICABILITY

The silicon-containing polymer of the invention is a novel compound, which can be easily prepared in a liquid, pasty, or other non-solid form. It can be easily modified by functional groups, may acquire reactivity, and may be used as a material having high a index of refraction. The silicon-containing polymer of the invention is rapidly cured and turned into a cured product having a non-tacky surface. Since the curable polymer composition of the invention can be formed into a transparent cured product having a high index of refraction, the composition can be used as a sealant for optical devices such as light-emitting diodes and is suitable for use in optical instruments. When the composition is combined with fillers, it can be employed as a sealant, a protective material, a coating material, a resilient material, etc.

The invention claimed is:

1. A curable polymer composition comprising:
   (A) a silicon-containing polymer represented by the following average unit formula:

$$(O_{2/2}SiR^1\text{-}R^2\text{—}C_6H_4\text{—}R^2\text{—}SiR^1O_{2/2})_x$$
   $$[R^3{}_aSiO_{(4-a)/2}]_y(R^4O_{1/2})_z$$

wherein $R^1$ designates identical or different, substituted or unsubstituted monovalent hydrocarbon groups; $R^2$ designates identical or different, substituted or unsubstituted alkylene groups; $R^3$ designates substituted or unsubstituted monovalent hydrocarbon groups, with the proviso that in one molecule at least two groups designated by $R^3$ are alkenyl groups; $R^4$ designates alkyl groups or hydrogen atoms; "a" is a positive number that satisfies the following condition: $0 \leq a \leq 3$; and "x", "y", and "z" are positive numbers that satisfy the following conditions: $0 < x < 0.1$; $0 < y < 1$; $0 \leq z < 0.1$; and $(x+y+z)=1$;
   (B) an organosilicon compound that contains in one molecule at least two silicon-bonded hydrogen atoms, wherein the silicon-bonded hydrogen atoms contained in this component are used in an amount of 0.1 to 10 moles per one mole of alkenyl groups contained in component (A); and
   (C) a hydrosilylation catalyst in a catalytic amount.

2. The curable polymer composition according to claim 1, wherein $R^1$ in the formula of component (A) is an alkyl group or an aryl group.

3. The curable polymer composition according to claim 1, wherein $R^2$ in the formula of component (A) is an ethylene group or a propylene group.

4. The curable polymer composition according to claim 1, wherein $R^3$ in the formula of component (A) is an alkyl group, an alkenyl group, or an aryl group.

5. The curable polymer composition according to claim 1, wherein component (B) is an organohydrogensiloxane represented by the following average structural formula:

$$R^6{}_bH_cSiO_{(4-b-c)/2}$$

wherein $R^6$ designates substituted or unsubstituted monovalent hydrocarbon groups that are free of unsaturated aliphatic bonds, and "b" and "c" are positive numbers that satisfy the following conditions: $0.7 \leq b \leq 2.1$; $0.001 \leq c \leq 1.0$; and $$0.8 \leq (b+c) \leq 2.6.$$

6. The curable polymer composition according to claim 2, wherein $R^2$ in the formula of component (A) is an ethylene group or a propylene group, and wherein $R^3$ in the formula of component (A) is an alkyl group, an alkenyl group, or an aryl group.

* * * * *